US006533369B2

(12) United States Patent
Baumgartner et al.

(10) Patent No.: US 6,533,369 B2
(45) Date of Patent: Mar. 18, 2003

(54) BRAKE SYSTEM AND METHOD HAVING SECONDARY HYDRAULIC BRAKING IN A DE-ENERGIZED OPERATIONAL MODE

(75) Inventors: Ernst S. Baumgartner, Dayton, OH (US); Bryan Peter Riddiford, Dayton, OH (US); Schuyler S. Shaw, Dayton, OH (US); John Benjamin Hageman, Vandalia, OH (US); Richard James Thomas, Kettering, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/821,970

(22) Filed: Mar. 30, 2001

(65) Prior Publication Data

US 2002/0140285 A1 Oct. 3, 2002

Related U.S. Application Data

(60) Provisional application No. 60/241,715, filed on Oct. 19, 2000.

(51) Int. Cl.$^7$ ................................................ B60T 8/60
(52) U.S. Cl. ................ 303/155; 303/113.4; 303/115.2; 303/11
(58) Field of Search .............. 303/155, DIG. 1–DIG. 4, 303/113.4, 10, 11, 115.2

(56) References Cited

U.S. PATENT DOCUMENTS

| 4,513,780 A | 4/1985 | Evans |
| 4,830,333 A | 5/1989 | Watson |
| 4,860,794 A | 8/1989 | Parrott et al. |
| 4,902,075 A | 2/1990 | Uno et al. |
| 4,940,294 A | 7/1990 | Foster |
| 4,940,295 A | 7/1990 | Adachi et al. |
| 5,005,919 A | 4/1991 | Shuey et al. |
| 5,018,798 A | 5/1991 | Parker et al. |
| 5,150,951 A | 9/1992 | Leiber et al. |
| 5,246,283 A | 9/1993 | Shaw et al. |
| 5,302,008 A | 4/1994 | Miyake et al. |
| 5,403,077 A | 4/1995 | Burgdorf et al. |
| 5,445,447 A | 8/1995 | Farr et al. |
| 5,490,721 A | 2/1996 | Bartell et al. |
| 5,499,805 A | 3/1996 | Anma |
| 5,593,216 A | 1/1997 | Hosoya et al. |
| 5,597,214 A | 1/1997 | Katagiri et al. |
| 5,603,483 A | 2/1997 | Reuter et al. |
| 5,609,401 A * | 3/1997 | Johnston et al. ............ 303/155 |
| 5,669,679 A | 9/1997 | Hammoud et al. |

(List continued on next page.)

Primary Examiner—Matthew C. Graham
(74) Attorney, Agent, or Firm—Scott A. McBain

(57) ABSTRACT

A brake system and method of controlling the system are disclosed. The system provides secondary hydraulic braking in a de-energized mode. The system includes a wheel brake associated with wheels of a vehicle typically at each corner of the vehicle. The wheel brake typically includes a caliper or drum for deceleration of the vehicle. The system includes a master cylinder in fluid communication with the wheel brake. In the de-energized mode, the master cylinder operates the wheel brake. A solenoid isolation valve decouples the master cylinder from the wheel brake when the system is in a normal, i.e., an energized, mode. As such, the master cylinder is isolated from the wheel brake and is prevented from operating the wheel brake. Alternatively, in the de-energized mode, the isolation valve couples the master cylinder with the wheel brake to provide the secondary hydraulic braking. The system includes an actuator assembly for operation of the wheel brake independent of the master cylinder when the system is in the energized operational mode. A second, normally-closed, solenoid valve opens in the energized mode to couple the actuator assembly with the wheel brake. The second solenoid valve closes in the de-energized mode to isolate the actuator assembly from the wheel brake such that the secondary hydraulic braking is provided through the master cylinder.

17 Claims, 3 Drawing Sheets

U.S. PATENT DOCUMENTS

| | | |
|---|---|---|
| 5,720,170 A | 2/1998 | Hageman et al. |
| 5,749,633 A | 5/1998 | Baumgartner |
| 5,806,939 A | 9/1998 | Feigel et al. |
| 5,823,636 A | 10/1998 | Parker et al. |
| 6,082,831 A | 7/2000 | Hageman et al. |
| 6,106,078 A | 8/2000 | Johnston et al. |
| 6,199,963 B1 * | 3/2001 | Shimizu ...................... 303/155 |
| 6,371,576 B2 * | 4/2002 | Nakano ...................... 303/158 |

* cited by examiner

BRAKE SYSTEM AND METHOD HAVING SECONDARY HYDRAULIC BRAKING IN A DE-ENERGIZED OPERATIONAL MODE

RELATED APPLICATIONS

This patent application claims priority to and all advantages of U.S. Provisional Patent Application No. 60/241,715 which was filed on Oct. 19, 2000.

TECHNICAL FIELD

The subject invention generally relates to a brake system and method having secondary hydraulic braking in a de-energized operational mode. More specifically, the subject invention relates to a brake system and method for vehicles using solenoid-controlled hydraulic braking.

BACKGROUND OF THE INVENTION

"Brake-by-wire" (BBW) brake systems are known in the art. Furthermore, a developing technological subset of BBW brake systems is known in the art as "dry interface" brake systems. In a typical dry interface brake system, driver input is transmitted to the brake system electronically through a controller such as an electronic control unit, rather than through conventional mechanical and hydraulic transmission of driver input. The driver input is transmitted by the controller to brake application devices at each corner. As understood by those skilled in the art, corner is a term used throughout the industry to describe all of the equipment that is used at the vehicle wheel assembly, including, but not limited to, the brake, the suspension, and the drive train systems.

Although dry interface brake systems eliminate some of the hydraulic components associated with standard hydraulic brake systems, it should be noted that these systems are not completely non-hydraulic or "dry." Unlike standard hydraulic brake systems, which utilize vacuum-assisted driver brake pedal force to generate the pressure necessary to apply the brakes, dry interface brake systems include actuator assemblies. These actuator assemblies utilize individual motors to drive power or ball screw devices and piston assemblies at each corner which generate the hydraulic pressure required to apply the brakes at that corner.

Although dry interface brake systems show enhancements over standard hydraulic brake systems by, for example, improving vehicle assembly and repair, dry interface brake systems may not be the braking system of choice at this time for various other reasons. For instance, to date, the dry interface brake systems do not utilize hydraulic braking as a secondary, or back-up, brake system to be used in the event of a failure of the electronics associated with the electronic control unit. As such, the dry interface brake systems of the prior art require advanced electronics to establish or provide a secondary brake system. Meeting customer expectations with respect to reliability may increase the costs associated with such advanced electronics for the secondary brake system.

Due to the challenges identified in the dry interface brake systems of the prior art, it is desirable to implement a "wet interface" brake system including a brake system and method of controlling the brake system that provides secondary hydraulic braking during a de-energized operational mode of the brake system.

SUMMARY OF THE INVENTION

A brake system and method for controlling the brake system of the subject invention are disclosed. The brake system and method provide secondary hydraulic braking in a de-energized operational mode, such as a power failure, of the brake system. More specifically, the brake system includes a wheel brake assembly including a brake application device, such as a brake caliper or brake drum, used for decelerating a vehicle. The brake system further includes a master cylinder in fluid communication with the wheel brake assembly. The master cylinder operates the brake application device when the brake system is in the de-energized operational mode.

A first valve, known in the art as an isolation valve, is disposed between the master cylinder and the wheel brake assembly. Preferably, the first valve is a solenoid valve. In a normal, energized operational mode of the brake system, the first valve decouples the master cylinder from the wheel brake assembly such that hydraulic fluid from the master cylinder is prevented from operating the brake application device while the brake system is in the energized operational mode. On the other hand, when the brake system is in the de-energized operational mode, the first valve couples the master cylinder with the wheel brake assembly. As such, the master cylinder can operate the brake application device in the de-energized operational mode thereby providing the secondary hydraulic braking, when needed, through the master cylinder.

The brake system of the subject invention also includes an actuator assembly. The actuator assembly provides primary braking in the brake system of the subject invention. The actuator assembly, which is in fluid communication with the wheel brake assembly, includes a motor, a screw device, and a piston for operation of the brake application device. More specifically, a controller communicates with the motor to drive the screw device and the piston thereby generating the hydraulic pressure necessary for operation of the brake application device. While the brake system is in the energized operational mode, the operation of the brake application device by the actuator assembly is independent of the master cylinder as the master cylinder is isolated from the wheel brake assembly.

The brake system further includes a second valve which is also preferably a solenoid valve. The second valve is disposed between the actuator assembly and the wheel brake assembly. Preferably, the second valve is disposed in the actuator assembly between the piston and the wheel brake assembly. The second valve is a normally-closed solenoid valve such that the second valve is closed in the de-energized operational mode and open in the energized operational mode. When open, the second valve directly couples the actuator assembly with the wheel brake assembly to allow the actuator assembly to operate the brake application device. On the other hand, when the second valve defaults into the closed position, the second valve isolates the actuator assembly from the wheel brake assembly. As such, as described above, the actuator assembly is isolated, and the secondary hydraulic braking is provided directly through the master cylinder.

The second valve may also be de-energized into the closed position, even as the first valve is energized into its closed position, in order to maintain constant operational pressure to the brake application device. In such a case, the actuator assembly can then be deactivated thereby eliminating the need to supply current, i.e., power, to the motor which reduces overall wear on the motor.

Accordingly, the subject invention provides a wet interface brake system including a brake system and method of controlling the brake system that improves upon conventional dry interface brake systems by providing secondary hydraulic braking during a de-energized operational mode, such as a power failure, of the brake system.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Referring to the Figures, wherein like numerals indicate like or corresponding parts throughout the several views, a brake system for providing secondary hydraulic braking in a de-energized operational mode is generally shown at 10. The de-energized operational mode of the brake system 10 typically occurs in the event of a power failure. The primary braking for the subject invention, which is used in a normal or energized operational mode of the brake system 10, is provided by electronic, i.e., brake-by-wire, actuation of an actuator assembly 12. The actuator assembly 12 will be discussed in greater detail below.

Figure 1:
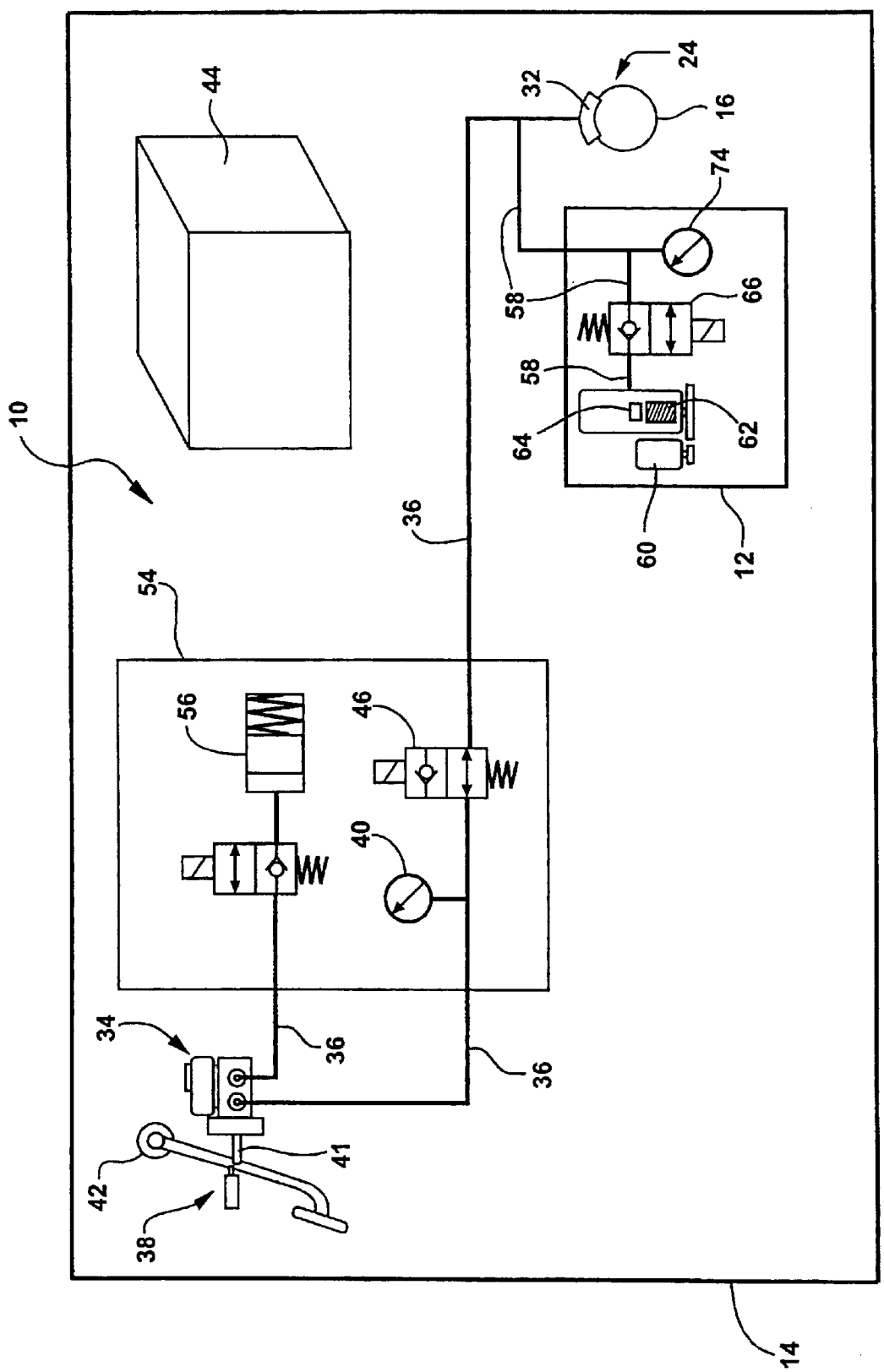
FIG. 1 is a schematic view of a brake system according to the subject invention illustrating a wheel brake assembly, a master cylinder, a first valve, an actuator assembly, a second valve, and an electronic control unit.
Figure 2:
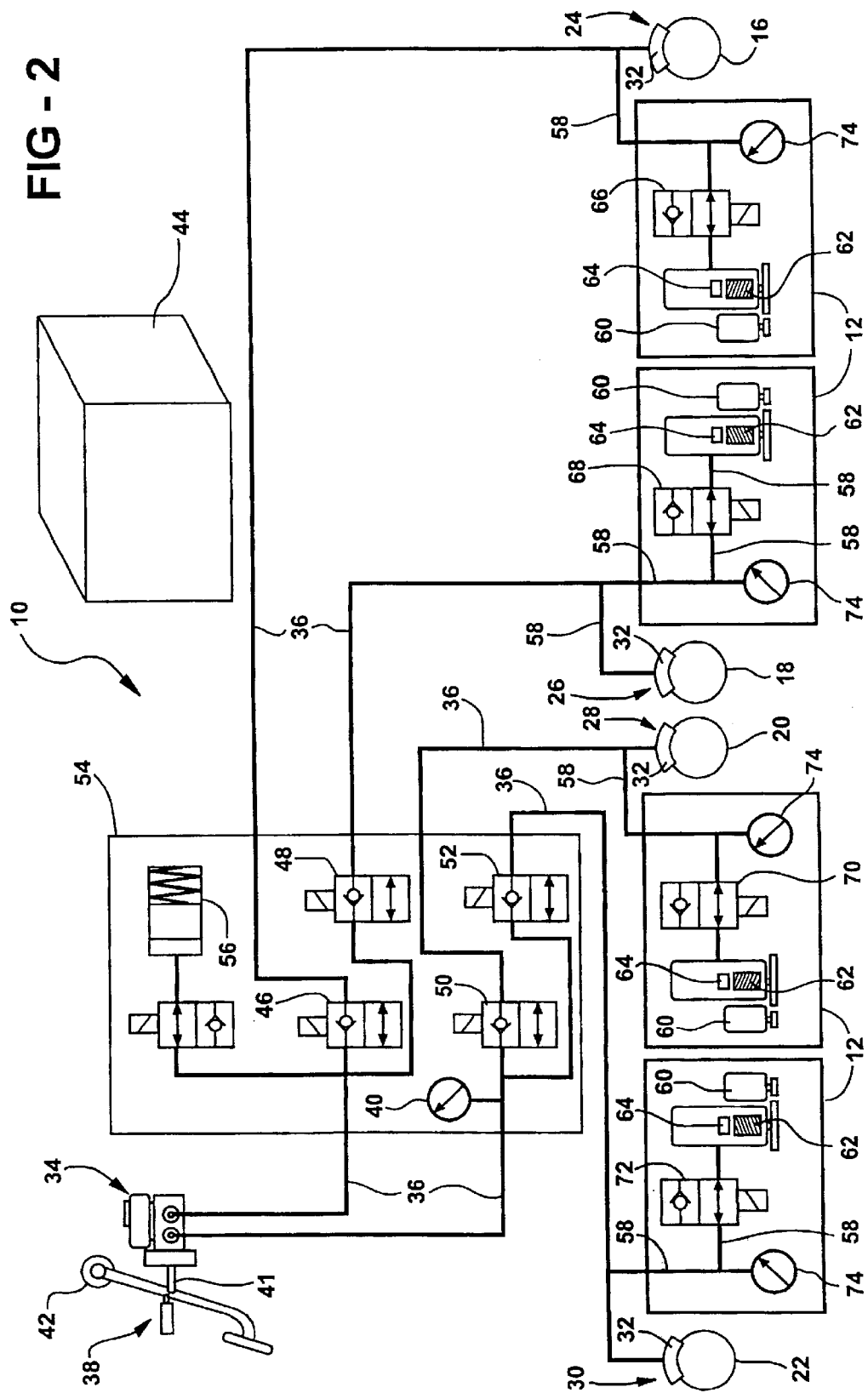
FIG. 2 is a schematic view of a brake system in combination with a plurality of vehicle wheels illustrating a wheel brake assembly, a master cylinder, a first valve, an actuator assembly, and a second valve, each associated with one of the wheels, the brake system is shown in an energized operational mode.
Figure 3:
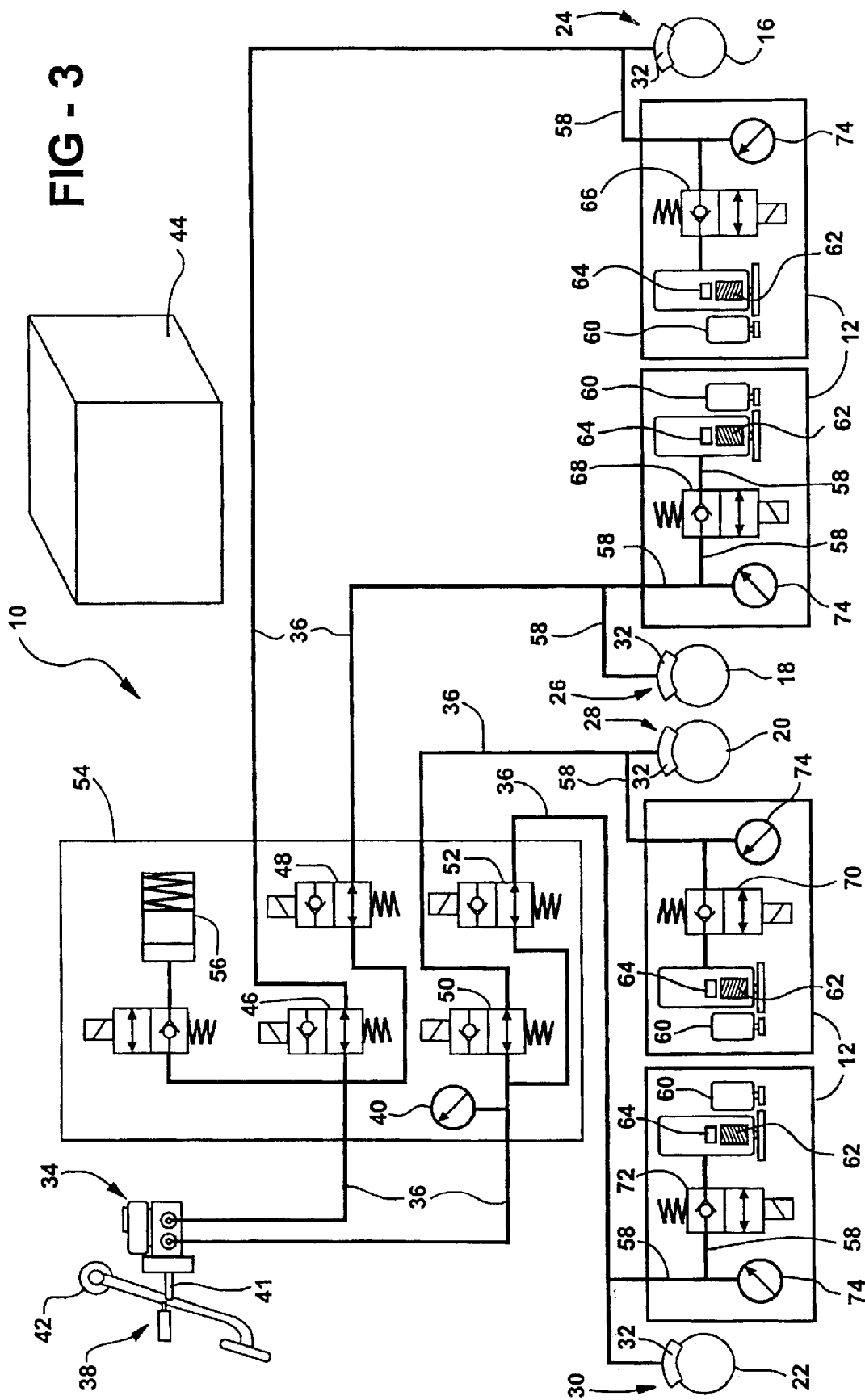
FIG. 3 is a schematic view of the brake system of FIG. 2 shown in a de-energized operational mode.

The brake system 10 of the subject invention is described below in terms of a brake system 10 for a vehicle 14, shown schematically in FIG. 1, having a wheel 16 at each corner of the vehicle 14 for a total of four wheels 16, 18, 20, 22. However, it is to be understood that the invention is not intended to be limited to vehicles having only four wheels 16, 18, 20, 22. As such, for clarity, the brake system 10 as disclosed in FIG. 1 only includes components for application of the brake system 10 at one wheel 16 of the vehicle 14. FIGS. 2 and 3 disclose the brake system 10 of the subject invention applied to the vehicle 14 having four wheels 16, 18, 20, 22. The wheel 16 represents the right-rear wheel, the wheel 18 represents the left-rear wheel, the wheel 20 represents the right-front wheel, and the wheel 22 represents the left-front wheel of the vehicle 14. Only the right-rear wheel 16 is disclosed in FIG. 1.

The brake system 10 includes a plurality of wheel brake assemblies 24, 26, 28, 30. Each of the wheel brake assemblies 24, 26, 28, 30 include a brake application device 32. As appreciated by those skilled in the art, the brake application device 32 is preferably a brake caliper at a front-end of the vehicle 14, and is preferably a brake caliper or a brake drum at a rear-end of the vehicle 14. For descriptive purposes, the front-end of the vehicle 14 denotes the right and left-front wheels 20, 22 of the vehicle 14, and the rear-end of the vehicle 14 denotes the right and left-rear wheels 16, 18 of the vehicle 14.

The brake system 10 includes a master cylinder 34 in fluid communication with each of the wheel brake assemblies 24, 26, 28, 30. More specifically, a first hydraulic line 36 extends between the master cylinder 34 and the wheel brake assemblies 24, 26, 28, 30 to enable the fluid communication. As will be discussed in greater detail below, the master cylinder 34 operates the brake application devices 32 when the brake system 10 is in the de-energized operational mode. As disclosed in the Figures, the preferred master cylinder 34 includes two output lines, one output line for the right and left-front wheels 20, 22, and another output line for the right and left-rear wheels 16, 18. For descriptive purposes, both of these output lines of the master cylinder 34 are equivalent to the first hydraulic line 36.

A brake pedal assembly 38 is operatively connected to the master cylinder 34 for operation of the brake application device 32. It is to be understood that the brake pedal assembly 38 operates the brake application device 32 both manually through the master cylinder 34 and electronically through a first pressure sensor 40, a travel or pedal position sensor 42, a controller 44, and the actuator assembly 12 which are all discussed below. For descriptive purposes only, the first pressure sensor 40 and the travel or pedal position sensor 42 are referred to below as first and second input sensors. It is also to be understood that the brake pedal assembly 38 is the preferred assembly for operation of the brake application devices 32. However, other assemblies for operation of the brake application device 32 including, but not limited to, a lever assembly are intended to be within the scope of the subject invention. Preferably, the brake pedal assembly 38 is interconnected to the master cylinder 34 through a push rod 41. For purposes of the subject invention, the brake pedal assembly 38 is also a brake input device. To operate the brake system 10, an operator of the vehicle 14 provides a first driver input through the brake input device.

A controller 44, such as the electronic control unit disclosed in the Figures, is operatively connected to the brake pedal assembly 38. More specifically, the brake system 10 of the subject invention includes the first and second input sensors 40, 42 which function to operatively connect the controller 44 to the brake pedal assembly 38. The first input sensor 40 is preferably a pressure transducer, and the second input sensor 42 is preferably a travel or pedal position sensor 42. The first input sensor 40 monitors the driver input into the brake pedal assembly 38. To monitor the driver input into the brake pedal assembly 38, the first input sensor 40 measures hydraulic pressure in the first hydraulic line 36, i.e., the output lines of the master cylinder 34. The second input sensor 42 is connected to a pivot point of the brake pedal assembly 38. The second input sensor 42 measures a degree of travel of the brake pedal assembly 38. The first and second input sensors 40, 42 provide the controller 44 with command signals relating to the driver input. With these command signals, the controller 44 activates the actuator assembly 12 in the energized operational mode to provide the primary braking. As described below, the actuator assembly 12 operates the brake application device 32 independent of the master cylinder 34 when the brake system 10 is in the energized operational mode.

Referring now to FIGS. 2 and 3, four first valves 46, 48, 50, 52, hereinafter referred to as isolation valves, are disposed between the master cylinder 34 and the wheel brake assemblies 24, 26, 28, 30, respectively. The four isolation valves 46, 48, 50, 52 are associated with the four wheels 16, 18, 20, 22 of the vehicle 14 and are preferably all disposed within an emulator assembly 54. Furthermore, the four isolation valves 46, 48, 50, 52 are preferably normally-open solenoid valves. As such, in the energized operational mode (FIG. 2), the four isolation valves 46, 48, 50, 52 close to decouple the master cylinder 34 from the wheel brake assemblies 24, 26, 28, 30, respectively. Therefore, the master cylinder 34 is prevented from operating the brake application device 32 in the energized operational mode.

On the other hand, in the event of power failure (FIG. 3), the four isolation valves 46, 48, 50, 52 open to couple the master cylinder 34 with the wheel brake assemblies 24, 26, 28, 30, respectively, such that direct fluid communication between the master cylinder 34 and the wheel brake assemblies 24, 26, 28, 30 is permitted. The hydraulic fluid in the master cylinder 34 is therefore able to operate the brake application device 32 in this de-energized operational mode to provide the secondary hydraulic braking through the master cylinder 34.

It is to be understood that the subject invention also includes a driver override feature. That is, in the event that isolation valves 46, 48, 50, 52 are 'stuck' in the closed position upon transition from the energized to the de-energized operational mode, the operator, through the master cylinder 34, can still open the isolation valves 46, 48, 50, 52 by direct application of the brake pedal assembly 38, i.e., the brake input device.

In addition to the four isolation valves 46, 48, 50, 52, the emulator assembly 54 also includes an emulator device 56. The emulator device 56 is also known in the art as an accumulator device. As shown in the Figures, the emulator device 56 is in fluid communication with the master cylinder 34. When the master cylinder 34 is decoupled from the wheel brake assemblies 24, 26, 28, 30 by the isolation valves 46, 48, 50, 52, respectively, in the energized operational mode, the emulator device 56 provides displacement by receiving the hydraulic fluid from the master cylinder 34. The emulator device 56, therefore, ensures proper 'feel' when the operator of the vehicle 14 applies the brake pedal assembly 38. Proper feel can be characterized as proper force versus travel versus damping characteristics.

The actuator assembly 12, which is in fluid communication with the wheel brake assembly 24, operates the brake application device 32 independent of the master cylinder 34 when the brake system 10 is in the energized operational mode. As disclosed in the Figures, there is one actuator assembly 12 associated with each wheel brake assembly 24, 26, 28, 30. The controller 44, which is also operatively connected to the actuator assembly 12, communicates with the actuator assembly 12 to activate the actuator assembly 12 in response to the driver input. As indicated above, the actuator assembly 12 provides the primary braking for the subject invention in the normal or energized operational mode. In this mode, the primary braking is independent of the master cylinder 34. A second hydraulic line 58 extends between each actuator assembly 12 and the wheel brake assemblies 24, 26, 28, 30 to enable the fluid communication between each actuator assembly 12 and the wheel brake assemblies 24, 26, 28, 30 for operation of the brake application device 32. In the particular embodiment of the subject invention applied to the vehicle 14 having four wheels 16, 18, 20, 22, the brake system 10 includes a plurality of actuator assemblies 12 wherein one actuator assembly 12 is disposed at each of the wheels 16, 18, 20, 22 and is in fluid communication with each wheel brake assembly 24, 26, 28, 30 associated with the wheels 16, 18, 20, 22, respectively.

The actuator assembly 12 includes a motor 60, a screw device 62, and a piston 64. As appreciated by those skilled in the art, the screw device 62 can be a power screw or a ball screw, or any other equivalent screw device 62 without varying the scope of the subject invention. The controller 44 activates the motor 60 of the actuator assembly 12 which, upon activation, rotates the screw device 62 to advance the piston 64 and increase hydraulic pressure to the brake application device 32.

A second valve 66 is disposed between the actuator assembly 12 and the wheel brake assembly 24. Preferably, the second valve 66 is actually a component of, and is disposed in, the actuator assembly 12 and is located between the piston 64 and the wheel brake assembly 24. The second valve 66, also preferably a solenoid valve, is a normally-closed valve. Therefore, when energized, the second valve 66 is open to couple the actuator assembly 12 with the wheel brake assembly 24. This coupling allows the actuator assembly 12 to operate the brake application device 32 in the energized operational mode.

On the other hand, when de-energized, the second valve 66 is closed to isolate the actuator assembly 12 from the wheel brake assembly 24. More specifically, as disclosed in FIG. 3, the second valve 66, upon closing in the de-energized operational mode, isolates at least a portion of the second hydraulic line 58. Because the second hydraulic line 58 and the actuator assembly 12 are isolated from the wheel brake assembly 24 by the second valve 66, the secondary hydraulic braking is provided through the master cylinder 34. It is to be understood that each actuator assembly 12 includes a second valve 66. Therefore, in the embodiment applied to the vehicle 14 having four wheels 16, 18, 20, 22, there are four second valves 66, 68, 70, 72.

The method of controlling the brake system 10 of the subject invention includes the steps of energizing and de-energizing the first 46 and second 66 valves as well as the step of activating the actuator assembly 12 in response to the first driver input to produce an operational pressure. More specifically, and as described above, in the energized operational mode, the first 46 and second 66 valves are energized. The first valve 46 is a normally-open valve that is energized into a closed valve position to decouple the master cylinder 34 from the wheel brake assembly 24. Also in the energized operational mode, the second valve 66 is a normally-closed valve that is energized into an open valve position to couple the actuator assembly 12 with the wheel brake assembly 24. Furthermore, in the de-energized operational mode, the first 46 and second 66 valves are de-energized. The first valve 46 is de-energized into an open valve position to couple the master cylinder 34 with the wheel brake assembly 24, and the second valve 66 is de-energized into a closed valve position to isolate the actuator assembly 12 from the wheel brake assembly 24.

The first driver input produces the operational pressure that operates the brake application device 32 independent of the master cylinder 34 in the energized operational mode. In the energized operational mode, this operational pressure is generated in the second hydraulic line 58 from the actuator assembly 12. As will be understood more completely below, producing the operational pressure is intended to include both increasing the operational pressure and decreasing the operational pressure.

The subject invention further includes a second pressure sensor 74 disposed between the actuator assembly 12 and the wheel brake assembly 24. Preferably, the second pressure 74 is a pressure transducer and is disposed in the second hydraulic line 58. The second pressure sensor 74 monitors or senses the hydraulic pressure, i.e., the operational pressure, in the second hydraulic line 58 that is generated from the actuator assembly 12 to operate the brake application device 32.

The second pressure sensor 74 senses this operational pressure produced by the actuator assembly 12 to determine if the operational pressure remains constant for greater than a predetermined time interval. For instance, if the predetermined time interval is three seconds, then the second pressure sensor 74 senses this operational pressure to determine if the operational pressure remains constant for greater than three seconds. If the operational pressure remains constant for greater than three seconds, then the normally-closed second valve 66 is de-energized to close while the first valve 46 is still isolated. The operational pressure required to operate the brake application device 32 can remain constant, and the actuator assembly 12 can be de-activated to save on excessive wear on the motor 60 and reduce power consumption by the motor 60.

In this state, if the operator of the vehicle 14 initiates a second driver input that is different than the first driver input, then the actuator assembly 12 is reactivated to modify the operational pressure required to operate brake application device 32 in response to the second input. Also, the normally-closed second valve 66 is re-energized to open such that hydraulic fluid can flow from or return to the actuator assembly 12. All of this is accomplished while the first valve 46 is still energized as closed to keep the master cylinder 34 isolated. It is to be understood that the second driver input is different from the first driver input in that the operator is either further depressing the brake pedal assembly 38 to demand additional deceleration of the vehicle 14, or the operator is releasing the brake pedal assembly 38 to lessen the deceleration of the vehicle 14 that is required.

More importantly, the primary function of the second pressure sensor 74 is to perform 'closed-loop control.' During closed-loop control, the second pressure sensor 74 reads actual pressure produced by the actuator assembly 12 and forwards a signal, indicative of the actual pressure, to the controller 44. Next, the controller 44, using an algorithm, controls the actual pressure in the actuator assembly 12 by increasing or decreasing the actual pressure to a desired pressure. As appreciated by those skilled in the art, the desired pressure is a function the driver input as determined with the first and second input sensors 40, 42. To increase or decrease the actual pressure, the controller 44 adjusts the power, i.e., the current, to the motor 60.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A brake system for providing secondary hydraulic braking in a de-energized operational mode, said system comprising:

a wheel brake assembly including a brake application device;

a master cylinder in fluid communication with said wheel brake assembly for operation of said brake application device when said brake system is in the de-energized operational mode;

a first valve disposed between said master cylinder and said wheel brake assembly to decouple said master cylinder from said wheel brake assembly in an energized operational mode such that said master cylinder is prevented from operating said brake application device in the energized operational mode, and to couple said master cylinder with said wheel brake assembly in the de-energized operational mode such that said master cylinder can operate said brake application device in the de-energized operational mode to provide the secondary hydraulic braking through said master cylinder;

an actuator assembly in fluid communication with said wheel brake assembly for operation of said brake application device independent of said master cylinder when said brake system is in the energized operational mode, said actuator assembly comprising a motor, a screw device, and a piston wherein, upon activation, said motor rotates said screw device to advance said piston and increase hydraulic pressure to said brake application device;

a controller operatively connected to said motor for activating said screw device and said piston to operate said brake application device independent of said master cylinder when said brake system is in the energized operational mode; and a second valve disposed between said actuator assembly and said wheel brake assembly, said second valve being normally-closed such that said second valve is open in the energized operational mode to couple said actuator assembly with said wheel brake assembly in the energized operation mode to allow said screw device and said piston to operate said brake application device, and is closed in the de-energized operational mode to isolate said wheel brake assembly from said screw device and said piston in the de-energized operational mode such that the secondary hydraulic braking is provided through said master cylinder.

2. A brake system as set forth in claim 1 wherein said second valve is disposed in said actuator assembly between said piston and said wheel brake assembly.

3. A brake system as set forth in claim 1 further comprising a brake pedal assembly operatively connected to said master cylinder for operation of said brake application device.

4. A brake system as set forth in claim 3 wherein said controller is operatively connected to said brake pedal assembly, said controller activating said actuator assembly in response to an input to said brake pedal assembly thereby operating said brake application device independent of said master cylinder when said brake system is in the energized operational mode.

5. A brake system as set forth in claim 4 further comprising a first pressure sensor monitoring said input to said brake pedal assembly and providing said controller with command signals relating to said input for activating said actuator assembly in the energized operational mode.

6. A brake system as set forth in claim 1 further comprising a first hydraulic line extending between said master cylinder and said wheel brake assembly, said first hydraulic line enabling the fluid communication for operation of said brake application device by said master cylinder during the de-energized operational mode.

7. A brake system as set forth in claim 6 further comprising a second hydraulic line extending between said actuator assembly and said wheel brake assembly, said second hydraulic line enabling the fluid communication for operation of said brake application device by said actuator assembly.

8. A brake system as set forth in claim 7 further comprising a second pressure sensor disposed between said actuator assembly and said wheel brake assembly for monitoring hydraulic pressure in said second hydraulic line.

9. A brake system as set forth in claim 7 wherein said second valve, upon closing in the de-energized operational mode, isolates at least a portion of said second hydraulic line such that the secondary hydraulic braking is provided from said master cylinder through said first hydraulic line.

10. A brake system as set forth in claim 1 further comprising an emulator device in fluid communication with said master cylinder for receiving hydraulic fluid from said master cylinder when said wheel brake assembly is decoupled from said master cylinder in the energized operational mode.

11. A brake system as set forth in claim 1 in combination with a vehicle having a plurality of wheels.

12. A brake system as set forth in claim 11 further comprising a plurality of wheel brake assemblies wherein one wheel brake assembly is associated with each of said wheels.

13. A brake system as set forth in claim 12 wherein said master cylinder is in fluid communication with each of said wheel brake assemblies.

14. A brake system as set forth in claim 13 further comprising a plurality of actuator assemblies, each actuator assembly including a second valve wherein one actuator assembly is disposed at each of said wheels and is in fluid communication with each wheel brake assembly associated with said wheel.

15. A brake system as set forth in claim 14 further comprising four first valves disposed between said master cylinder and each of said wheel brake assemblies.

16. A brake system as set forth in claim 15 further comprising an emulator assembly wherein said four first valves are all disposed within the emulator assembly.

17. A brake system as set forth in claim 1 wherein said brake application device is a brake caliper.

* * * * *